Figure 9:
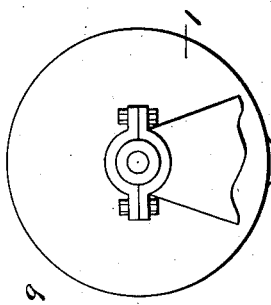

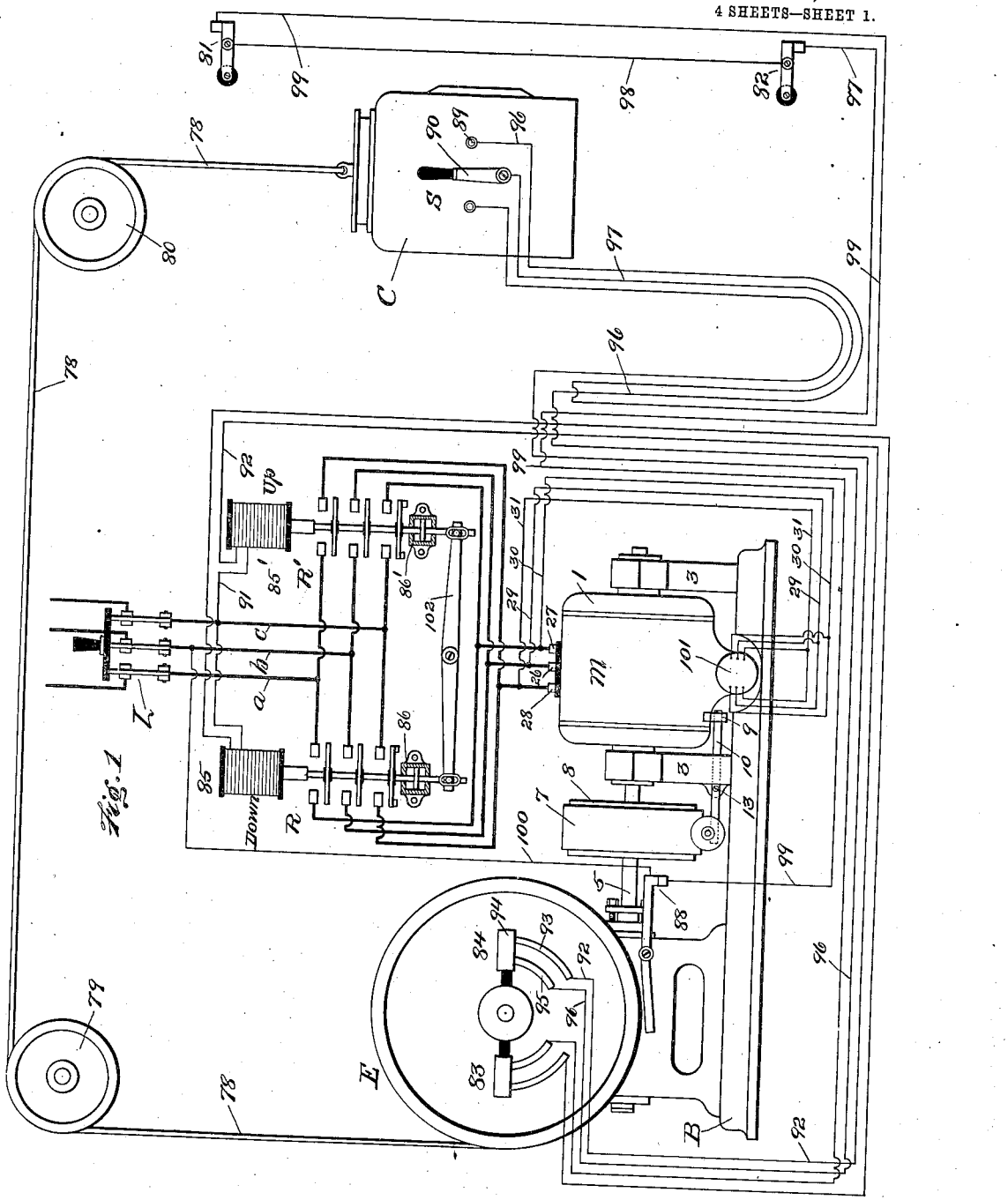

W. N. DICKINSON, Jr.
PROTECTIVE APPARATUS FOR ALTERNATING CURRENT ELEVATORS.
APPLICATION FILED JUNE 9, 1906. RENEWED JUNE 10, 1909.
950,224.
Patented Feb. 22, 1910.
4 SHEETS—SHEET 2.
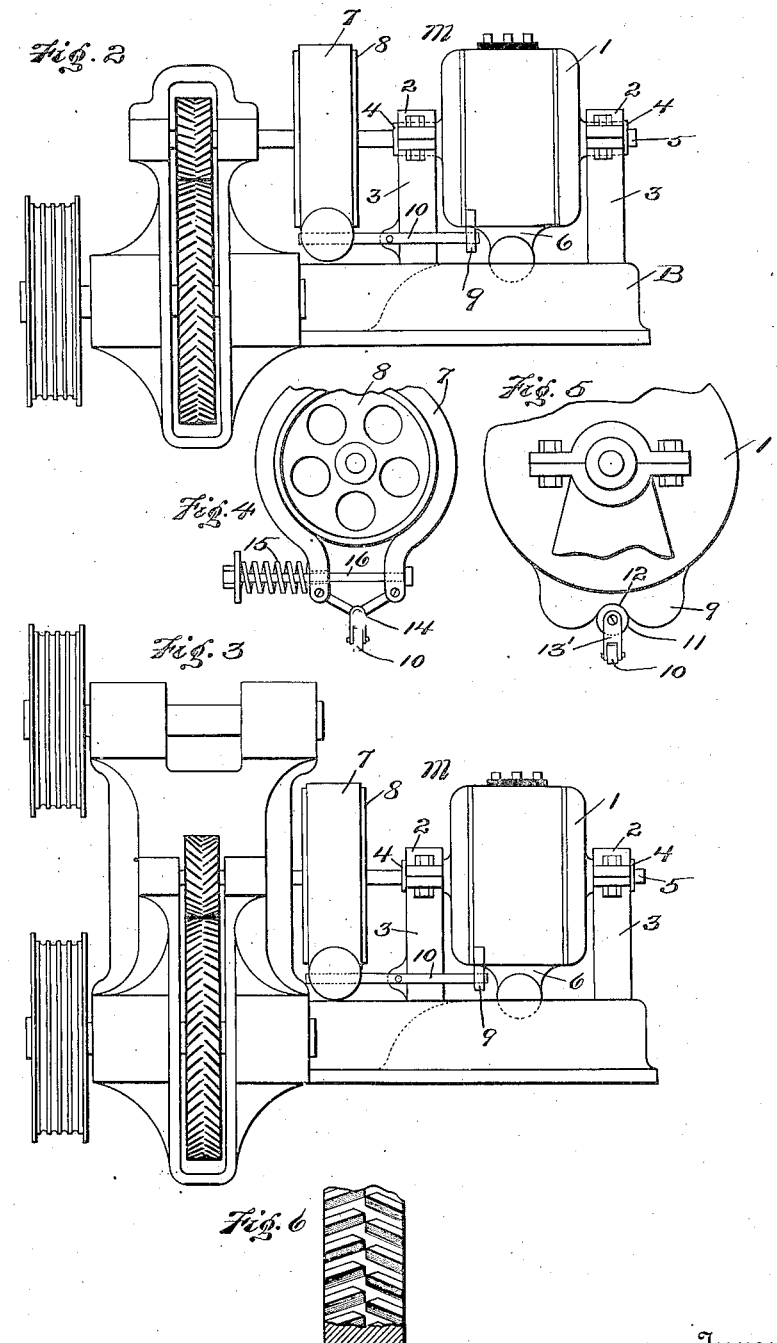

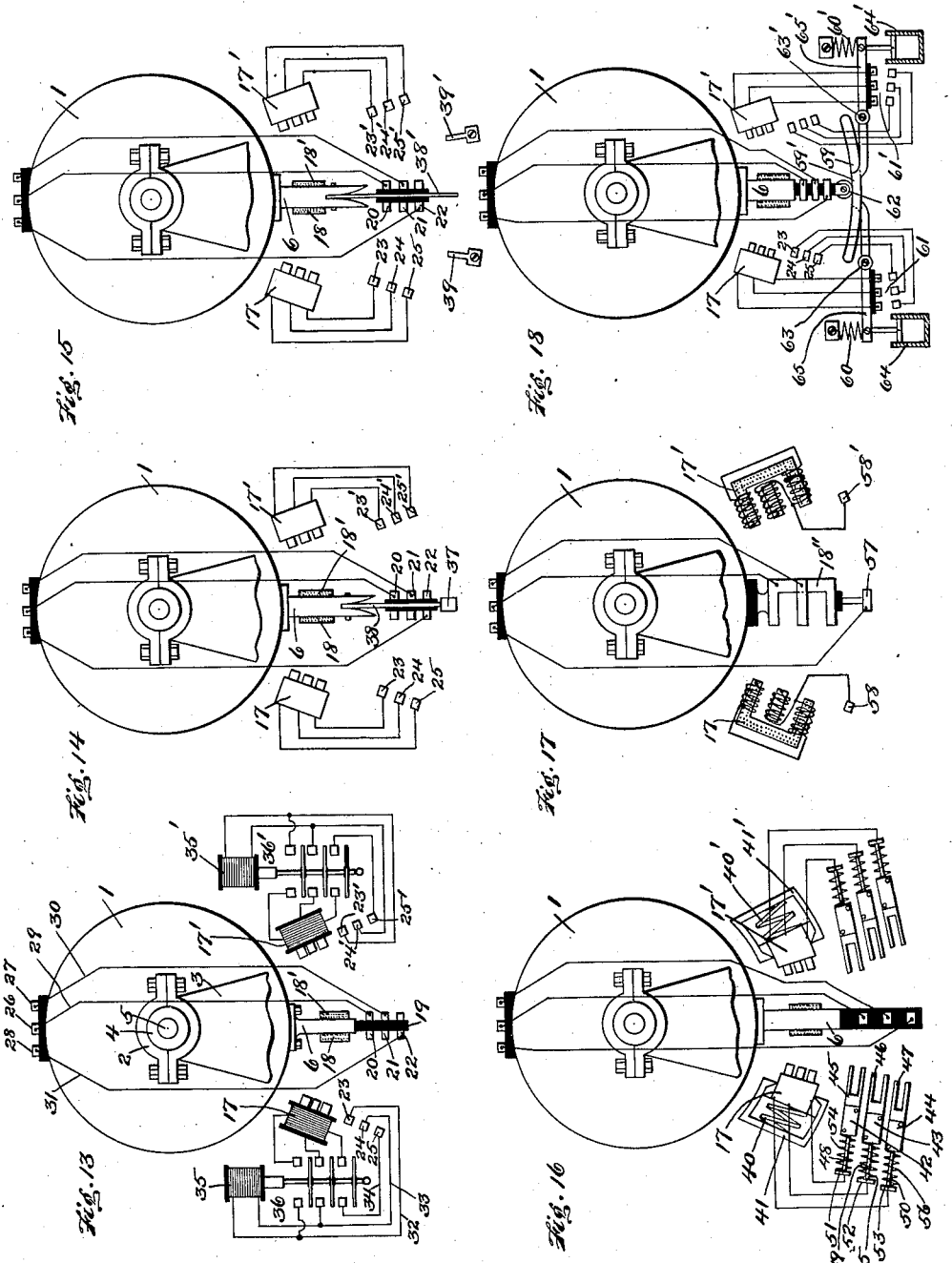

UNITED STATES PATENT OFFICE.

WILLIAM N. DICKINSON, JR., OF NEW YORK, N. Y., ASSIGNOR TO OTIS ELEVATOR COMPANY, OF JERSEY CITY, NEW JERSEY, A CORPORATION OF NEW JERSEY.

PROTECTIVE APPARATUS FOR ALTERNATING-CURRENT ELEVATORS.

950,224.   Specification of Letters Patent.   Patented Feb. 22, 1910.

Application filed June 9, 1906, Serial No. 320,957.  Renewed June 10, 1909.  Serial No. 501,436.

*To all whom it may concern:*

Be it known that I, WILLIAM N. DICKINSON, Jr., a citizen of the United States, residing in New York city, borough of Brooklyn, and State of New York, have invented a new and useful Improvement in Protective Apparatus for Alternating-Current Elevators, of which the following is a specification.

My invention relates to apparatus for controlling electric motors, and although it is herein shown applied to a hoist of an elevator system, it may have a general application.

The primary object of my invention is the provision of brake apparatus for an electric motor and means for automatically effecting the application of the brake upon the main line current being interrupted.

A further object of the present invention is the provision of a torque release brake for electric motors dependent directly upon the motor itself for its operation.

Another object of my invention is the provision of means for operating a brake to release position and holding it in such position, with minimum consumption of current.

A further object is the provision of a torque release brake in combination with economic and safe means for controlling alternating current motors of the single phase or multiphase type.

The movement within limits of one of the members of the power motor mounted as described in this specification, also provides a convenient means for protecting the whole apparatus from undesired results due to unexpected change in phase relation on a multiphase circuit. A device of this nature is described in my co-pending application, Serial Number 321,692 filed June 14, 1906 for an improvement in safety devices for alternating current hoisting apparatus.

Other objects of my invention will appear hereinafter, the novel combination of elements being pointed out in the claims.

In the accompanying drawings, Figure 1 represents diagrammatically an elevator system with my invention applied thereto; Figs. 2 to 6 inclusive illustrate the brake apparatus and details thereof; Figs. 7 to 12 inclusive show various centering devices that may be used if desired; and Figs. 13 to 18 inclusive show the electric means for holding the brake in released position, and modifications of such means.

It should be particularly noted that one of the limiting conditions of the size of elevator apparatus which may be installed to operate upon alternating current circuits, is the amount of starting current required by the elevator motor and the brake releasing magnet. This starting current being thrown upon the line at irregular and possibly frequent intervals, will tend to disturb the potential of the line to the detriment of lighting or other power service, or even possibly so lower the potential of the line as to interfere with the efficient action of the elevator apparatus. It becomes important, therefore, to reduce the amount of starting current required by the elevator, but at the same time to in no wise sacrifice the safety features of the elevator apparatus. Certain types of motor windings and starting devices to correspond therewith, are employed in connection with alternating current motors for the purpose of obtaining great starting torque with small expenditure of current, but the speed regulation of the motor should also be considered, as the well known means of over-counter weighting an electric elevator in order to allow the use of a small power unit and to add to the total operating efficiency of the device, carriers with it the condition that at times the tendency exists for the load to drive the hoisting drum rather than the hoisting apparatus to drive the load.

Should the hoisting drum be driven by the load and consequently, therefore, also the motor, it is desirable that the latter should exert an electro-dynamic braking effect after the current is cut off from the motor or is reduced. A means of producing a dynamic braking effect in the alternating current motor is treated of in my co-pending application, Serial No. 292,541, filed Dec. 20, 1905, for an improvement in electro-dynamic brake for alternating current motors. If desired this latter means may be employed in conjunction with the device which I am now describing. It will be evident, however, that with a mechanical control alternating current elevator, the operation of the control and the lifting of the brake when the supply of current is cut off from the circuit, would introduce an element of danger in connection with any elevator machine which is sufficiently efficient to allow the unbalanced load, either on the car side or on the counterweight side, to start the machine from rest. This is for the reason that in the event of the brake being lifted to the off position, it would be possible for the elevator, under certain load conditions, to attain a speed far in excess of its normal maximum owing to the fact that there is no inherent retarding action in the motor itself to prevent this. In a direct current elevator system, the connection of the armature to the field forms a convenient, and the usually employed means for covering this point. In an alternating current elevator equipped with an electric brake, this same danger is present only to a limited degree, as it will be evident that by the operation of the car control it will be impossible to release the brake on the hoisting machine unless current is present on the lines. It will also be evident that a broken or dis-arranged connection or connections of the motor with a perfect connection for the brake, would still allow of the same runaway conditions obtaining. To secure the release of the electric brake requires expenditure of current at the time when it is desirable to cut down such current, that is, at the time of the starting of the elevator.

As an electric brake of the type now usually employed requires a very large current until its magnetic circuit has been closed, the employment of the ordinary type of electric brake brings up serious objection from the operative standpoint. In both of the above premises not only is the maximum speed attained to be considered as the danger element, but the fact that with the brake released and no current being supplied to the motor, the elevator car is liable to start in either direction, depending upon whether the predominate weight exists on the car side or the counterweight side at the time, irrespective of whether the control which has released the brake has been thrown either for the up motion or for the down motion, presents the contingency that the elevator machine may move in the direction opposite to that which it would move if the current supply to the motor were perfect. And in this event the automatic stop devices heretofore usually employed for bringing the elevator to rest at predetermined or terminal landings under normal conditions, would be either entirely useless or rendered materially ineffective, and the continued travel of the car and the counterweights beyond normal limits would result, either effect depending upon the speed and weight of the moving mass.

In consideration of the above, it will be obvious that the application of a braking device whose action must from its nature be co-incident with and depend upon the introduction and interruption of current into the power motor, is to be desired. The device which I am about to describe is based upon this principle.

Referring to Fig. 2, it will be seen that the stator 1 of the alternating current motor M is mounted in bearings 2, 2, which may be of any desired type. These bearings are placed in convenient positions at the upper ends of the supports or standards 3, 3 secured to the bed plate B. The journals of the stator are rigid with the stator frame and are designated by the reference numbers 4, 4. The axis of the stator bearings is co-incident with the axis of the rotor shaft 5, in that the journals 4, 4 themselves form bearings for the rotor shaft 5. It is therefore evident that the stator may be given a rotative movement about the rotor and the latter rotated within the stator. The stator frame 1 carries a downwardly extending arm or lug 6, in this instance, by means of which centralizing springs or other centralizing forces keep the stator, when little or no current is present in the motor, in an approximately definite position. Means may also be provided in connection with such arm or extension 6 for limiting the rotative movement in a direction concentric with the rotative movement of the rotor. Such means may comprise devices placed in fixed position in the path of the arm or lug 6, as for example the circuit-closers and holding magnets illustrated in Figs. 13 to 18, inclusive. The limiting devices whether in the form of separate abutments or in the form of circuit-closers and holding magnets, as explained, are preferably located on the bed plate, but may be placed wherever desired. For instance, they may be secured on the inner sides of the bed plate B, an opening for the passage for the arm 6 being provided in the top of the bed plate in an obvious manner.

In Fig. 1, I have shown an ordinary multiphase induction motor of the squirrel cage type connected to an elevator winding machine E, the whole being equipped with a brake 7 which is adapted to be applied to the brake pulley 8 on the rotor shaft 5. This pulley may be in the form of a coupling between the shaft of the motor and the worm shaft of the winding machine. The motor may have a definite wound rotor provided with slip rings connected to an exterior starting device. Or said motor could be of any of the well known single phase types, or it could be a double motor arranged either in a single casing or a double casing, for the purpose of reducing peripheral speed, and therefore the braking effort necessary, or for reducing the starting current, or for other reasons, without departing from the braking principles herein described. I have shown a simple motor merely for the sake of clearness.

On the exterior of the stator casing 1 is a cam 9, in this instance downwardly projecting as shown in Figs. 1, 2, 3 and 5. This cam is for the purpose of actuating the lever 10 to effect the release of the brake. In this instance a roller 11 is pivoted to the extension 13' of the lever 10 and normally lies in the recesses 12 of the cam 9. The brake lever 10 may be pivoted at 13 to one of the supports or standards 3, and is connected at its left-hand end as viewed in the figures, to the brake which is illustrated in detail in Fig. 4. Obviously any suitable brake apparatus may be employed, but in this instance I have shown a toggle connection 14 between the lever 10 and the lower ends of the brake 7. By means of the spring 15 and bolt 16, the brake is applied to the pulley 8 whenever the roller 11 lies in the recess 12 of the cam 9. When, however, the cam 9 is actuated so as to move the lever 10, the brake will be released against the action of the spring 15. In other words, the movement of the cam 9 in either direction from center will cause the roller 11 to ride on one of its higher points and thus release the brake. The return of the cam to its central position will allow the roller to again lie in the recess 12, being forced to such position by the brake spring 15. That is, the cam 9 may be so shaped that it will not only actuate the lever 10 to release the brake, but will also permit the spring 15 to return the stator to normal or central position. Other centering devices as shown in Figs. 7 to 12 inclusive, and hereinafter explained in detail, may also be used if desired.

With no current in the motor, the stator is held in central position and the brake is applied. Upon the introduction of current to the motor, the rotor being held stationary by the brake, the torque produced between the stator and the rotor will effect the rotation of the stator either in one direction or the other, depending upon the phase relation of the current introduced. The stator being so rotated, carries with it the cam 9 which actuates the brake lever 10, and which in turn releases the brake. When the stator is thus rotated and the brake released, the arm 6, as indicated in Figs. 13 to 18 inclusive, moves with the stator. The armatures 18, 18' carried by said arm are moved against the poles of the alternating current magnet 1, or 17', depending on the direction in which the stator 1 is moved. Insulated contacts carried by the arm 6 are also moved into engagement with certain fixed contacts.

Referring particularly to Fig. 13, it will be seen that the arm 6 is provided with an extension 19 of insulation, which extension carries the contact pieces 20, 21 and 22 which are respectively connected to the stator terminals 26, 27 and 28 by means of the wires 29, 30 and 31. Assuming that the stator 1 is moved in a clockwise direction as viewed in Fig. 13, the movable contacts 20, 21 and 22 will be moved into engagement with the fixed contacts 23, 24 and 25 respectively. Substantially at the same time, or a short time before, the armature 18 is brought into engagement with the holding magnet 17 so as to close its magnetic circuit before it is energized. When the movable contacts have been thus brought into engagement with the fixed contacts, a circuit is closed from the main line through the single phase electromagnet 35 to which are connected the leads 32 and 33. Upon the energization of the electro-magnet 35 the switch 36 will be closed and current will flow to the holding magnet 17 from the fixed contacts 23, 24 and 25 through the wires 32, 33 and 34 respectively. The holding magnet is thus energized while its magnetic circuit is closed, and, therefore, this magnet takes only a very small current but firmly holds the stator in the position to which it has been rotated by the initial torque.

Fig. 14 illustrates a principle of inertia in which the inertia feature is in the movable contact-carrier, the contact being mounted on a light spring 38 but insulated therefrom and made heavy or provided with a weight 37. On the sudden throw of the stator due to initial torque, the movable contacts 20, 21 and 22 will lag behind in movement owing to the inertia of the spring 38 and the weight 37. This will allow the armature 18 or 18' to be brought into magnetic contact with the poles of the holding magnet 17 or 17' before the circuit of such magnet is closed. That is, the magnetic contact of the holding magnet will be made before the resilient strength of the spring overcomes the inertia stored up in the suspended contacts or in the weight 37, but as soon as its inertia has been overcome, the spring exerts its closing force and brings the electrical contacts 23, 24 and 25 or 23', 24' and 25' into electrical circuit with the solenoid of the holding magnet 17 or 17'.

Fig. 15 illustrates a spring 38' connected to the lower end of the arm 6 and obstructions 39 and 39' placed in the path of movement of the lower end of said spring. When the stator is rotated in one direction or the other, the lower end of the spring 38' will strike against one of these obstructions and then snap by the same. The closing of the electrical contacts will therefore be delayed until the magnetic circuit has been closed. This slight time element allows of the firm closing of the magnetic circuit of the holding magnet before the electrical circuit to such magnet is completed.

In Fig. 13 the time element arrangement is obtained by means of the separate electromagnet 35 or 35' which may be adjusted either directly or in conjunction with suitable retarding means to form any requisite time element desired. The initial torque throw of the stator electrifies the contacts of switch 36 or 36' controlled by the electromagnet 35 or 35', and also completes a circuit to the solenoid of either of said magnets slightly before the magnetic circuit of the holding magnet is completed, in order to obtain a firm electrical contact by means of a slight further movement of the stator 1. That is, the contacts 20, 21 and 22 may be brought into electrical connection with the fixed contacts 23, 24 and 25 a short time before the armature 18 is brought into engagement with the poles of the holding magnet 17. Then assuming a slight flexibility of the parts, the arm 6 will be moved farther until the armature 18 meets the poles of the magnet 17 and the movable contacts will therefore be brought into firmer engagement with the fixed contacts. The delay caused in closing the electric circuits to the holding magnet coils by the magnet 35, prevents the completion of the electrical circuit to the holding magnet coils until their magnetic circuit has been completed. The magnet 35 or 35' having but a small duty to perform, will require only a fraction of the current necessary for the holding magnet coils.

Fig. 16 illustrates a method in which the holding magnets 17 and 17' are mounted so as to be slightly movable preferably in the arc of a circle, and may be arranged either with a coil spring as indicated at 40 and 40', back of the holding magnet, in a self-centering socket 41 or 41', or the magnet may be mounted on an arm hung radially from the same axis as the stator. On the impact caused by the initial torque, the live contacts carried by the stator arm 6 will engage with the terminals 42, 43 and 44 connected with the holding magnet coils and mounted in any suitable manner in a stationary frame adjacent the holding magnet. The relative distance arrangement of magnetic contacts and electrical contacts is such that the former will be completed first and the inertia stored up in the stator will cause the holding magnet to be carried back against its flexible backing or spring 40 or 40'. At this time the live contacts on the stator lug will be brought into electrical connection with the fixed terminals so that the holding electromagnet will then be energized to hold the stator within the limits of the movement of the magnet in its centering socket or holding frame.

As the pole pieces of the magnet 17 are movable in the arrangement illustrated in Fig. 16, and the contacts 42, 43 and 44 are stationary, the inertia throw of the stator drives the contacts carried by the stator arm 6 in between the contact clips 45, 46 and 47, which are connected to the rods 48, 49 and 50 respectively. These rods are provided with heads 51, 52 and 53 between which and the fixed frames 42, 43 and 44, are placed the springs 54, 55 and 56. It will therefore be seen that the rods 48, 49 and 50 must slide through the parts 42, 43 and 44 as bearings, and that the clips 45, 46 and 47 are normally held in outward position by the springs 54, 55 and 56.

If the torque conditions are such as to allow either the backing springs 40 or 40' in the holding magnet frame to return the magnet to its former position, the electrical connections between the contacts on the stator arm 6 and the clips 45, 46 and 47 will still be maintained as the latter have a strong friction hold on the former and are connected to the springs 54, 55 and 56 in such a manner that they may be moved forward a short distance without coming against a solid stop which would allow the stator contacts to be dis-engaged from said clips. With this arrangement, not only will there be a firm electrical connection between the stator arm terminals and the switch contacts for the holding electro-magnet, but vibrations due to alternations of current in the stator or variations of main line voltage, will be absorbed by the spring 40 or 40'.

Fig. 17 illustrates a method whereby the electric circuits to the holding magnet coils are completed by means of contact between the armature and pole pieces of the magnet itself. A commercial type of multiphase magnet is here shown in which the magnet is made up of two magnetic circuits set at right angles to one another, the iron cores of which are electrically insulated from each other, as are also the armatures for the pole pieces, said armatures being carried by the stator frame 1. 18'' designates the armature structure which is shown rigidly connected with the stator frame 1 but insulated therefrom. Carried by the armature structure 18'' but insulated therefrom, is an electrical contact 57 and in the path of movement of this contact are fixed contacts 58 and 58'. The connections to one end of each of the two energizing coils of the holding magnet are completed through the cores and their corresponding armatures, and the common return for the two holding magnet coils may be completed through the third contact 57. The movable contact 57 may be brought into engagement with the fixed contact 58 or 58' before the magnetic circuit is closed, without interfering with the desired result in the device.

Fig. 18 illustrates a method in which the time element feature is introduced by means of a mechanical movement. The stator arm 6 when in central position, holds the cams 59 and 59' in their lowermost position against the action of the springs 60 and 60'. In so doing the switches 61 and 61' for the holding magnets 17 and 17' are held in open position. This is accomplished by means of the anti-friction roller 62 carried at the lower end of the stator 6 and which is of sufficient width to engage both the cams 59 and 59' which are arranged in parallel relation with each other. The lever arms carrying these cams are pivoted at 63 and 63', and at their outer ends are mounted the springs 60 and 60' and the dash pots 64 and 64'. When now the initial torque of the stator throws the armature of the holding magnet in position to complete its magnetic circuit, and the terminals carried by the stator arm 6 are brought into engagement with the fixed contacts in their paths of movement, the roller 62 will be moved off from one of the cams 59 or 59'. If the stator arm 6 is moved to the left as viewed in Fig. 18, the cam 59 will be released and the spring 60 will move the cam arm 65 in a downward direction. The dash pot 64 will then retard the downward motion of the arm 65 so that the armature of the holding magnet will be brought into engagement with the poles of the holding magnet 17 at a time coincident with or slightly before the switch 61 is closed.

Various other modifications could be made by those skilled in the art without departing from the operation and scope of my invention, as defined by the claims.

The various modifications in Figs. 13 to 18 inclusive, have been set forth to illustrate some variations that could be made, each modification embodying the principles of closing the magnetic circuit of the holding magnet before or substantially at the same time that its electric circuit is closed. In the event of the load tending to drive the hoisting machine, the tendency would be to rotate the stator to central position and then to the opposite limit of its rotating movement, at some time after it had received its initial rotative movement, but the holding magnet prevents this. It should be noted that the holding magnet need not be of large dimensions for the reason that the magnetic circuit is closed at the time it receives current and therefore it does not need to exert its influence through an air gap. On the stopping of the elevator the current is cut off from the motor and consequently at the same time also from the holding magnet. Torque therefore will no longer exist between the rotor and stator, and the holding effect of the holding magnet no longer existing, the stator will be returned to its central position by means of a centering device, and the brake will be immediately applied.

The operation of the release and application of the brake when current is applied to produce movement of the car in the opposite direction, is similar to that above noted, with the exception that the initial torque between the stator and rotor would effect a rotation of the stator arm and the armature against the opposite holding magnet.

The fact that in order to release the brake, current is sent only to the motor, makes it clear that in starting no current is required other than that necessary to produce the starting torque in the motor, and this may of course be only that required by the most desirable type of motor which may be employed. This same fact makes it clear that it is absolutely impossible to release the brake unless current is already in the motor, and it will be equally clear that by proper adjustment of the amount of torque necessary to work against the centering device, this principle may be still further refined to insure also that the current admitted to the motor must be right in every way to lift or support the heaviest load on the elevator, before the brake will release, thus insuring the absolute safety of this device in this most important particular. The fact that the circuit to the holding magnet is completed after the magnetic circuit has been closed makes the current taken by this magnet a very small and almost negligible quantity.

Figure 12:
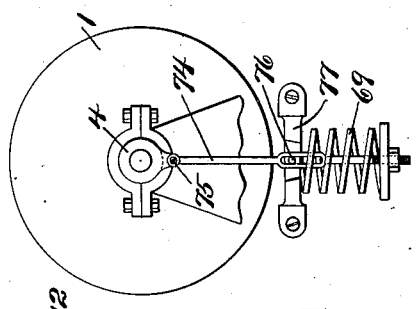
Figure 8:
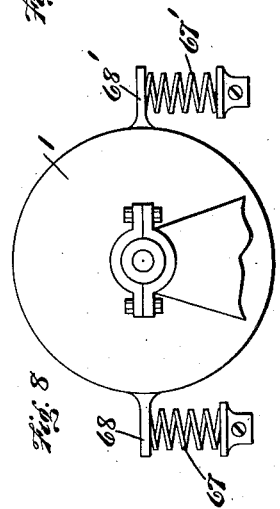
Figure 11:
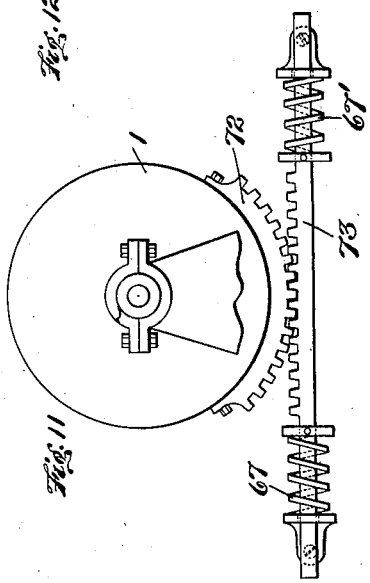
Figure 7:
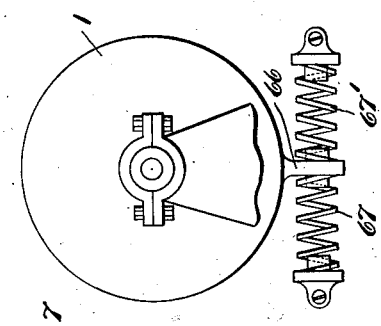
Figure 10:
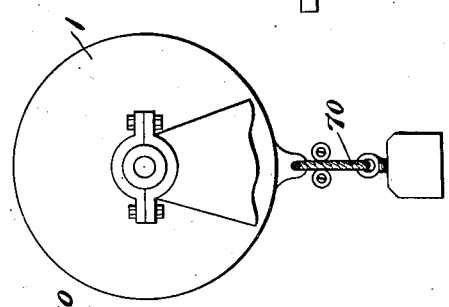

Various centering devices independent of the brake spring and cam 9 may be used if desired. For the purposes of illustration, I have shown some types of centering devices in Figs. 7 to 12 inclusive. In Fig. 7, 66 designates an arm movable with the stator frame 1, and 67, 67' designate the centering springs. In Fig. 8, two arms are shown movable with the stator frame 1, said arms being held substantially in horizontal position by the centering springs 67, 67'. In Fig. 9 a single centering spring 69 is employed, a flexible device 70 connecting said spring to a lug 71 on the stator frame 1. In Fig. 10 is illustrated a centering device similar to that shown in Fig. 9 in that a weight is substituted for the spring. In Fig. 11 a segment 72 is movable with the stator frame 1 and meshes with the rack bar 73 which is actuated upon by the centering springs 67, 67'. In Fig. 12 a bar 74 is pivoted to the journal 4 of the stator frame 1 at 75 and has a pin-and-slot connection at 76 with the rigid support 77 for the centering spring 69.

While the torque release brake herein described, is illustrated in connection with an alternating current elevator, it is applicable also to direct current, and to any form of alternating current or direct current apparatus in which the action of the brake simultaneously with the application or interruption of power, or approximately so, is desired.

In Fig. 2 I have illustrated the application of the brake to an elevator machine employing the sheave drive principle of what are known as "traction elevators." I have also shown in Fig. 2 a very efficient type of speed reduction in that herring-bone or double helical gears with cut teeth are used. Fig. 3 illustrates apparatus similar to Fig. 2 but illustrates further how the brake may be used with elevator apparatus employing means for increasing the amount of friction contact with the traction sheave. Fig. 6 illustrates in detail a herringbone gear with cut teeth.

The introduction of Figs. 2, 3 and 6 brings out more clearly the safety, importance and operative advantage of the torque release brake. The illustration of a more efficient type of gearing than the gearing ordinarily employed with the type of elevator shown in Fig. 1, brings more clearly to the mind the fact that it is quite possible for the load to start and accelerate to a high speed provided the brake is released with no current in the motor. As hereinbefore explained, the torque release brake provides against such contingency. It is obvious, however, that the more efficient the gearing is, the smaller the motor need be, and in consequence the smaller will be the starting current necessary both on account of the total work to be accomplished at the motor shaft while running as well as on account of the smaller amount of mass in the rotor itself to be accelerated. The total cost of current for running the elevator will therefore be smaller and the wear and tear on the brake apparatus will be less due to the smaller amount of mass to be stopped, and the initial cost of the power unit necessary together with any controlling device which may be employed in conjunction therewith, will be lower. All these advantages may be obtained and the apparatus still rendered safe by the employment of the torque release brake. The torque releasing brake on the motor shaft may be used in conjunction with a similar brake on the low speed shaft of a speed reducing device for elevators or other purposes, or in conjunction with mechanical or electrical emergency brakes which are used at the terminals of travel of the elevator car, or in conjunction with a dynamic, or air brake. The particular point to be noted is the absolute connection between the power application and the brake release, and between the power cut-off and the brake application; together with the fact that no additional current for releasing the brake is required at the critical moment of starting, and that but a very small amount of current is required during the running of the motor to secure the holding of the brake in off position.

Referring now to Fig. 1, the circuits of an electric elevator system to which my invention may be applied, will be traced so far as is deemed necessary to explain the operation of said system and the automatic torque release brake. C designates the elevator car, which is connected by means of the cables 78 passing over the sheaves 80 and 79 to the hoisting drum E. S designates the switch in the car for controlling the reversing switches R and R'. The holding magnet connections are illustrated diagrammatically at 101 at the lower part of the elevator motor M. The exact connections of the holding magnet that may be used are clearly illustrated in Figs. 13 to 18 inclusive. By throwing the controlling switch in the car to one of its circuit-closing positions, the corresponding core of the solenoid 85 or 85' on the control board will be excited with single phase current. Thereupon either the switch R or R' will be operated so as to close the main line circuit between the main line switch L and the motor terminals 26, 27 and 28, in the proper direction to start the car upwardly or downwardly as desired. Obviously any suitable form of reversing switch may be used, but in this instance circuit-closing plates are attached to the solenoid rods of the electro-magnets 85 and 85'. When either the switch R or switch R' is closed, not only is the circuit closed to the motor stator terminals, but also to the contacts carried by the stator arm 6 as illustrated in Figs. 13 to 18 inclusive. A mechanical interference bar 102 may be interposed between the solenoid rods to prevent both the switches R and R' from being closed at the same time. Small dash pots 86 and 86' may be placed in convenient position to prevent too sudden reversal of the phase relation of the current to the motor. When the car switch is brought back to central position, the controlling electro-magnet 85 or 85' which has been operated, will release its core and the circuit-closing plates movable therewith so that the corresponding switch R or R' will be moved to open position. The power to the motor M is thus cut off and also to the holding magnet, thus allowing the brake spring or one of the centering devices illustrated in Figs. 7 to 12 inclusive, to bring the motor stator 1 to central position and permit the application of the brake apparatus to stop the motor hoisting apparatus and the car.

It will be noticed that circuits have been provided in conjunction with the regular type of automatic limit switches on the elevator machine, to bring the car to rest at its limits of travel and still allow it to be regularly operated in the opposite direction to that in which it traveled before operating one of said limit switches. Additional safety devices may be used, as for example, automatic means for opening the main line circuit, and as disclosed in my co-pending application, Serial No. 324,542, filed July 3, 1906, for an improvement in safety release magnet for brake apparatus.

Assuming that it is desired to move the car upwardly, the switch lever 90 in the car should be moved into engagement with the contact 89, whereupon the single-phase circuit will be closed from the main c through the wire 91, solenoid of the magnet 85', and thence by way of wire 92 to and through segment 93, bridge 94, and the segment 95 of the machine limit switch 84; the circuit then continues through wire 96 to the contact 89 in the car, lever 90, wire 97, hatchway limit switches 82 and 81 connected by the wire 98, wire 99, slack cable switch 88, wire 100, to another of the main line circuits a or b; in this instance b. The magnet 85' being thus energized, the switch R' will be closed against the momentary retarding action of the dash pot 86' and the stator frame 1 moved to proper position as hereinafter explained, so as to close the magnetic circuit of the holding magnet before its electrical energizing circuit is closed. The stator frame is rotated to bring the armature carried by the stator arm 6 against the holding magnet and substantially at the same time releasing the brake apparatus to permit the rotor to rotate and also closing the circuit to the holding magnet so that the stator frame will be held in its limiting position and consequently the brake apparatus held in released position.

Although I have herein shown certain apparatus to illustrate the principles of my invention, it is obvious that those skilled in the art may make various changes in the details and the arrangement of parts without departing from the spirit and scope of my invention as defined by the claims. I desire therefore not to be limited to the exact construction herein disclosed.

Having thus described my invention, what I desire to have protected by Letters Patent of the United States is:—

1. The combination with an alternating current motor, brake apparatus therefor, electric means for holding said brake apparatus in released position, and means for closing the magnetic circuit of said holding means at the same time or before its electrical circuit is closed.

2. The combination with an alternating current motor having a movable stator frame, of brake apparatus for said motor, connections between the stator frame and said brake apparatus to effect a release of the latter upon the stator receiving current, an electro-magnet for holding said stator frame in brake-released position, an armature moved by said stator frame, and an electric switch for said holding magnet and controlled by the stator frame to effect its closure substantially at the same time or after the armature has been moved into engagement with the poles of the magnet.

3. The combination with a motor, of a brake therefor, brake-applying mechanism, a holding electro-magnet, and means for simultaneously completing the magnetic and electric circuits of said holding electro-magnet and acting upon said brake-applying mechanism to effect a release of the brake.

4. The combination with a motor, of brake apparatus therefor, an electro-magnet for holding the brake in released position, and means for energizing said electro-magnet simultaneously with or after the closure of its magnetic circuit.

5. The combination with a motor, of a brake therefor, means co-acting with a part of the motor for releasing said brake, a holding device for maintaining the brake in released position, and means for rendering effective said holding device after the brake has been released.

6. The combination with a motor, of a brake therefor, brake-applying apparatus, brake-releasing mechanism, an electro-magnet for holding said brake in released position, and means for simultaneously or successively completing the magnetic and electric circuits of said holding electro-magnet and operating said brake-releasing mechanism to release the brake.

7. In a torque-release brake, the combination with a stator frame of an alternating current motor, of a brake for the rotor, means actuated by movement of the stator frame for releasing said brake, an electro-magnet for holding said stator frame in its limiting position and the brake in released position, and means for effecting the energization of said electro-magnet simultaneously with or after the closure of its magnetic circuit.

8. In a torque-release brake, the combination with a revoluble stator frame of an alternating current motor, of a brake for the rotor, brake-releasing apparatus actuated by the stator frame upon movement thereof, an electro-magnet, an electric switch for said electro-magnet, and means carried by the stator frame for closing the magnetic circuit and the electric circuit of said electro-magnet to cause the latter to hold the stator frame in its limiting position.

9. In a torque-release brake, the combination with a revoluble stator frame, of a brake for the rotor, brake-releasing mechanism, a cam for actuating said mechanism upon movement of said frame in either direction from a predetermined position, two electro-magnets for holding said stator frame in its limiting positions, an armature connected to said frame and moved thereby against the poles of either of said electro-magnets, and an electric switch for each of said electro-magnets and operated by said frame to effect the energization of the corresponding holding electro-magnet simultaneously with or after the closure of its magnetic circuit.

10. In a torque-release brake, the combination with a revoluble stator frame, of electro-magnets for limiting the movement thereof and holding the same in limiting position, a switch for each electro-magnet and operated by said frame to effect the energization of the corresponding electro-magnet simultaneously with or after its magnetic circuit is completed, a brake for the rotor, brake-releasing apparatus operated by said frame upon application of current to the motor, and means for returning the stator frame to normal position to effect the application of the brake when the current to the motor is cut off.

11. In an elevator system, the combination with a car, hoisting apparatus and motor, of a brake for the rotative part of said motor, brake-releasing apparatus operated by a limited rotative movement of the other part of the motor, electro-magnets for holding the said other part in limiting position and the brake released, and means for directing current to one of said holding electro-magnets simultaneously with or after its magnetic circuit is completed.

In testimony whereof, I have signed my name to this specification in the presence of two subscribing witnesses.

WILLIAM N. DICKINSON, Jr.

Witnesses:
W. H. STOKES,
CHARLES M. NISSEN.